United States Patent [19]
Eneboe

[11] Patent Number: 5,694,586
[45] Date of Patent: Dec. 2, 1997

[54] CONTROLLER USING TIME-DOMAIN FILTER CONNECTED TO A SIGNAL LINE TO CONTROL A TIME AT WHICH SIGNAL LINE IS SAMPLED FOR RECEIPT OF INFORMATION TRANSFER SIGNAL

[75] Inventor: Michael K. Eneboe, San Jose, Calif.

[73] Assignee: Apple Computer, Inc., Cupertino, Calif.

[21] Appl. No.: 432,804

[22] Filed: May 2, 1995

[51] Int. Cl.$^6$ .................................................. G06F 13/00
[52] U.S. Cl. .................... 395/552; 364/724.01; 375/350
[58] Field of Search ..................... 340/15.5 SC; 375/94, 375/8, 103; 364/900, 200; 343/435

[56] References Cited

U.S. PATENT DOCUMENTS

| | | | |
|---|---|---|---|
| 3,774,146 | 11/1973 | Goupillaud | 340/15.5 SC |
| 4,475,106 | 10/1984 | Andrews | 343/435 |
| 4,501,003 | 2/1985 | Miller | 375/94 |
| 4,583,232 | 4/1986 | Howell | 375/8 |
| 4,631,702 | 12/1986 | Korba | 364/900 |
| 4,780,888 | 10/1988 | Solhjell et al. | 375/103 |
| 4,829,425 | 5/1989 | Bain, Jr. et al. | 364/200 |

OTHER PUBLICATIONS

"X3T9.2/855D, Revision 12b, Jun. 7, 1993, Reference No. ISO/IEC; 199x/ANSI X3.199x", printed Jun. 11, 1993, pps. i–ix and 1–65.

Primary Examiner—Thomas C. Lee
Assistant Examiner—David Ton
Attorney, Agent, or Firm—Burns, Doane, Swecker & Mathis, L.L.P.

[57] ABSTRACT

The present invention is directed to providing a method and apparatus for improving the reliability of signal detection in signal lines used to receive information transfer signals such as the request and acknowledge signals of a small computer system interface, without degrading information transfer signals which are output from the small computer system interface and without inhibiting the use of both asynchronous and synchronous modes of information transfer. In accordance with exemplary embodiments, rather than using a filter to damp an incoming signal, a time-domain filter is used to determine when the incoming signal is expected to be valid. The time delay can, if desired, be programmed by the user so that the delay can be easily varied to account for specific signal conduits and peripheral devices. In accordance with exemplary embodiments, the information transfer signals can be received via the time-domain filter during an initial asynchronous mode of information transfer. A time delay of the time-domain filter can then be gradually reduced; if it is determined that reliability of signal detection remains relatively high, then information transfer can be switched to a synchronous mode, such that the filtered input signal line is disabled, and the information transfer signals can be both sent and received via the unfiltered output signal line.

20 Claims, 2 Drawing Sheets

CONTROLLER USING TIME-DOMAIN FILTER CONNECTED TO A SIGNAL LINE TO CONTROL A TIME AT WHICH SIGNAL LINE IS SAMPLED FOR RECEIPT OF INFORMATION TRANSFER SIGNAL

BACKGROUND OF THE INVENTION

1. Field of the Invention

The present invention relates generally to the operation of input/output (I/O) controllers, and more particularly, to a method and apparatus for enhancing the operation of such devices.

2. State of the Art

Input/output controllers are widely used in computer system architectures for interfacing a first device, such as a main controller, with one or more peripheral devices. For example, small computer system interfaces (SCSI) are known input/output controllers used to transfer information between a main controller and one or more peripheral devices connected to their local bus.

Information is transferred on the local bus of the input/output controller between two devices at any given time. The devices connected to the local bus can be any combination of initiator devices (that is, devices which request another device to perform a specified process) and target devices (that is, devices which execute the process requested by the initiator device) provided there is at least one initiator device and one target device at any given time. Each device connected to the local bus has an address and corresponding identification bit assigned to it such that one device can act as an initiator device and the other can act as a target device. The peripheral devices connected to the local bus can include memory devices (e.g., disk drives, tape drives, and so forth), printers or any other intelligent or non-intelligent device.

Small computer system interface devices can provide both synchronous and asynchronous transfers of information using information transfer (e.g., handshaking) signals. For example, standardized request and acknowledge handshake signals of a small computer system interface are set forth in the SCSI-2 ANSI document X3.131-1994 (SCSI-2) and in the working draft of the document entitled "X3T9.2/855D, Revision 12b, Jun. 7, 1993, Reference No. ISO/IEC; 199x/ ANSI X3.199x". These documents set forth the standard for defining mechanical, electrical and timing requirements of SCSI-2 and SCSI-3 parallel interface for use with the SCSI-2 and SCSI-3 Interlocked Protocol Standards, the contents of which are hereby incorporated by reference in their entireties.

The request signal is typically sourced by a target device to indicate a request for an information transfer on the local bus. The acknowledge signal is typically sourced by an initiator device as a response which verifies acknowledgement of the request. Each of these signals can have either an asserted (e.g., TRUE) state or a negated (e.g., FALSE) state. Signals that are asserted can be actively driven to the TRUE state, while signals that are negated may either be actively driven to a FALSE state or released to a FALSE state. A signal that is released goes to the FALSE state because the bias of a cable terminator pulls the signal false. Any device driver of a small computer system interface controller that is not active is placed into a high-impedance state.

Information transfers on the local bus of the small computer system interface follow a defined request/acknowledge transaction (RAT). According to the small computer interface standard, request/acknowledge transactions can be used for any information transfer service, including, for example, command, status, message-out, message-in, data-out and data-in services. A request/acknowledge transaction can be either asynchronous or synchronous depending on a request/ acquisition offset value. An offset value of zero specifies an asynchronous transfer while non-zero offset value specifies a synchronous transfer.

An exemplary asynchronous information transfer from a target device to an initiator device can be performed by the target device first asserting data bus signals to a desired value and then asserting the request signal. The data bus signals remain valid until the acknowledge signal is TRUE at the target device. The initiator device reads the data bus signals after the request signal is TRUE, and then asserts the acknowledge signal. When the acknowledge signal becomes TRUE at the target device, the target device can change or release the data bus signals and then negate the request signal. After the request signal is FALSE, the initiator device negates the acknowledge signal.

For asynchronous transfer from the initiator device to the target device, the target device requests information by asserting the request signal. The initiator device drives data and parity signals to their desired values, then asserts the acknowledge signal. The initiator device continues to drive the data and parity signals until the request signal from the target device is FALSE. The target device does not negate the request signal until the acknowledge signal becomes TRUE at the target device and data and parity signals have been read. Once the request signal becomes FALSE at the initiator device, the initiator device can change or release the data and parity signals, and then negate the acknowledge signal.

Having described asynchronous information transfer in a small computer system interface, a brief discussion of synchronous data transfer will be provided. During synchronous data transfers, the request or acknowledge pulse is a transition of a request or acknowledge signal from a FALSE to TRUE and back to FALSE condition. The initiator device detects a request pulse after the transition of the request signal from FALSE to TRUE. The target device detects an acknowledge pulse after the transition of the acknowledge signal from FALSE to TRUE.

Synchronous data transfers allow noninterlocked data transfers between an initiator device and a target device after the first request pulse and before the request/acknowledge offset is reached. The target device generates request pulses independent of the acknowledge pulses until the request/ acknowledge offset is reached. The initiator device generates acknowledge pulses independent of the request pulses until the number of acknowledge pulses equals the number of request pulses detected.

The request/acknowledge offset specifies the maximum number of request pulses that can be sent by a target device in advance of the number of acknowledge pulses received from the initiator device, thereby establishing a pacing mechanism. If the number of request pulses exceeds the number of acknowledge pulses by the request/acknowledge offset, the target device cannot assert the request signal until after the leading edge of the next acknowledge pulse is received. A requirement for successful completion of a data service is that a number of acknowledge and request pulses be equal.

Signal outputs, such as the request and acknowledge signal outputs, are typically formed as single-ended outputs which use either passive—negation or active-negation drivers. Passive—negation drivers implemented using an open-collector or an open-drain circuits have two states: asserted and high-impedance. Active-negation drivers have three states—asserted, negated and high-impedance—and are typically used for handshaking signals such as the acknowledge and request signals.

To minimize the number of pins on a small computer system interface, a single ended output is typically used for both the input and output of a handshake signal. However, because signal buses have characteristics which can include stub capacitances and cable/termination impedance mismatches, poor signal quality on trailing (i.e., low-to-high) edges of handshaking signals can occur. A reflection, or series of reflections, can therefore result and produce signal glitches.

FIG. 1 illustrates an exemplary timing diagram of request and acknowledge signals. As can be seen in the low-to-high transition of the request signal, glitches due to undesirable reflections (caused, for example, by cable delays) can result in an unacceptable transition. Assuming that lower and upper thresholds $V_{1L}$, and $V_{1H}$, define the boundaries of a logic level high condition, these glitches can result in improper detection of multiple transitions, and therefore unreliable detection of the request signal.

To address the unreliability in detecting such handshaking signals, attempts are often made to maintain the characteristic impedance of bus conductors relatively low. However, for handshaking signals to achieve acceptable initial levels when released in passive negation, it is helpful for the characteristic impedance to be relatively high.

Further, cables with impedances having matching characteristics are often selected to minimize discontinuities and signal reflections. However, such selections can require trade-offs in shielding effectiveness, cable length, the number of loads, transfer rates, and cost.

Other attempts to address the poor signal quality in handshaking signals include using filter circuits within the monolithic integrated circuit on which the small computer system interface is formed. However, where a single-ended signal line is used for both the input and output of a given signal (such as the request or acknowledge signal), the filter may improve signal quality on the input signal, but the increased impedance associated with the filter will degrade performance of the output signal. Further, the fabrication of internal circuitry on the monolithic integrated circuit is complex, costly and subject to process variations. In addition, because the filter circuitry must be formed at the time the monolithic integrated circuit is formed, exact characteristics of the signal line and cables which are connected to the small computer system interface cannot be taken into account, thereby substantially inhibiting flexibility in filter design.

Accordingly, it would be desirable to provide a small computer system interface wherein improved reliability can be achieved for detection of input handshaking signals without degrading signal quality of output handshaking signals. Further, it would be desirable to provide a small computer system interface wherein such improved reliability can be achieved with relatively simple circuitry. In addition, it would be desirable to provide a circuit designer the flexibility to take exact characteristics of signal conduits and devices into account. Further, it would be desirable to eliminate any need to design a filter, such as an analog filter, with characteristics matched to an expected signal line such that reflections can be accurately damped.

SUMMARY OF THE INVENTION

The present invention is directed to providing a method and apparatus for improving the reliability of signal detection in signal lines used to receive information transfer signals such as the request and acknowledge signals of a small computer system interface, without degrading information transfer signals which are output from the small computer system interface and without inhibiting the use of both asynchronous and synchronous modes of information transfer. In accordance with exemplary embodiments, rather than using a filter to damp an incoming signal, a time-domain filter is used to determine when the incoming signal is expected to be valid. The time delay can, if desired, be programmed by the user so that the delay can be easily varied to account for specific signal conduits and peripheral devices. In accordance with exemplary embodiments, the information transfer signals can be received via the time-domain filter during an initial asynchronous mode of information transfer. A time delay of the time-domain filter can then be gradually reduced; if it is determined that reliability of signal detection remains relatively high, then information transfer can be switched to a synchronous mode, such that the filtered input signal line is disabled, and the information transfer signals can be both sent and received via an unfiltered signal line (that is, dedicated, unfiltered input and output signal lines or an unfiltered input/output signal line).

Where a digital time domain filter is formed using a counter, a resolution to any practical clock frequency can be achieved, and readily varied. In accordance with exemplary embodiments, a relatively simple filter circuit can therefore specifically address the source of reflections in a given signal line. If desired, the filter circuit can be formed external to any monolithic circuit on which all or any portion of the small computer system interface is formed.

Generally speaking, exemplary embodiments of the present invention relate to a method and apparatus for transferring information between a controller and at least one device. An exemplary apparatus according to the invention includes an interface device for controlling a transfer of information between said controller and said at least one device, said interface device having a first signal line for receiving at least one information transfer signal which is input to said apparatus during information transfer between said controller and said at least one device; a second signal line for sending said at least one information transfer signal during information transfer between said controller and said at least one device; and a time-domain filter connected to said first signal line to control a time at which said first signal line is sampled for receipt of said information transfer signal.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 2:
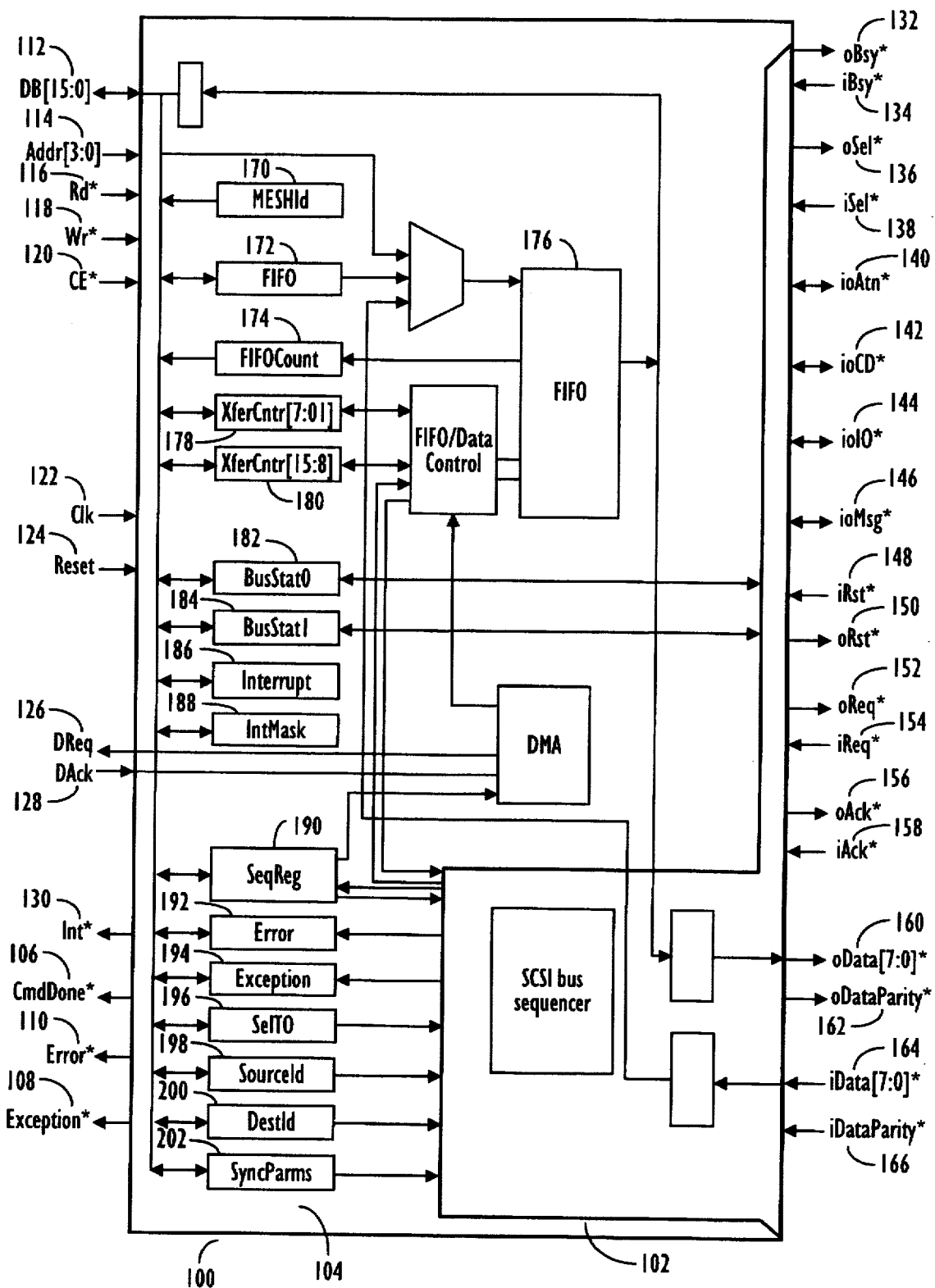
FIG. 2 is an exemplary embodiment of a small computer system interface in accordance with the present invention.

FIG. 2 illustrates an exemplary embodiment of a first controller which can, for example, be used as a peripheral device interface for a second controller. For purposes of illustrating features of the present invention, the first controller is represented in FIG. 2 as an input/output controller, in particular, a small computer system interface (SCSI) formed as a monolithic integrated circuit. The first controller of FIG. 2 communicates over a first main bus with the second controller, referred to herein as a main, or host controller (not shown). The first controller interfaces the main controller to one or more devices connected to a second, local bus of the first controller.

Those skilled in the art will appreciate that the first controller can either initiate an input/output process requested by the main controller (initiator mode) or respond to a request from a device on the local bus to perform an input/output process (that is, serve as a target in a target mode).

Where the first controller is a small computer system interface, distributed arbitration can be included as bus contention logic for the local bus. A priority system can be used to award control to the highest priority device requesting access to the first controller's local bus in any known fashion.

Although the exemplary FIG. 2 embodiment of a first controller is described in the context of a small computer system interface, it will be appreciated that such an embodiment is by way of illustration only. The present invention is not limited to enhancing operation of small computer system interfaces; rather, those skilled in the art will appreciate that advantages of the present invention can be realized for any controller used as an interface. For example, the invention is equally applicable to network interface controllers, such as ethernet controllers, which control access of a device to a network.

Further, those skilled in the art will appreciate that features of the present invention are applicable to any protocol-based controller which uses a single signal line for bidirectional control signals, such as information transfer signals. For example, the invention is equally applicable to serial interfaces which toggle signal lines through various handshaking signal states. Further, while the entire device of FIG. 2 can be formed as a single monolithic integrated circuit, any number of separately formed integrated or non-integrated devices can also be used for any of the subcomponents illustrated in FIG. 2. For example, those skilled in the art will appreciate that any of the components shown, such as the controller bus sequencer and/or bus signal drivers can be formed as a separate integrated or non-integrated circuits.

To better illustrate features of the present invention, the exemplary FIG. 2 embodiment shows a first controller 100 which includes two general components: a controller bus sequencer 102; and a microprocessor/direct memory access (DMA) interface. All components other than the controller bus sequencer can be considered the microprocessor/direct memory access interface for receiving information from the main controller via data bus 112 of a first main bus.

The controller bus sequencer includes a processor for executing each command of a transaction requested by the main processor. A transaction can include one or more operations, or commands, which the first controller must execute to complete an information transfer operation. For example, a transaction can include an initial command for the first controller to arbitrate for access to its local bus, followed by a selection command to select a destination for the information transfer, followed by an information transfer command. Upon completing execution of each command in a transaction, the first controller transmits status information to the main controller via the microprocessor/direct memory access interface. The controller bus sequencer also monitors the first controller's operation and bus status. Using this information, the bus sequencer generates the status signals which are sent to the main controller.

As described in commonly assigned, co-pending U.S. patent application Ser. No. 08/432,818, filed May 2, 1995 entitled "METHOD AND APPARATUS FOR ACCELERATING OPERATION OF AN INPUT/OUTPUT CONTROLLER", the disclosure of which is hereby incorporated by reference in its entirety, the operation status transmitted by the first controller to the second controller is selected from among a group of status responses which include:

(1) supplying a first output signal, designated herein as a Command Done signal, to the second controller on a Command Done signal line 106, the Command Done signal being indicative of the first controller 100 having completed execution of a requested operation;

(2) supplying the Command Done signal and a second output signal, designated herein as an Exception signal on an Exception signal line 108, the Exception signal being indicative of an acceptable but undesired condition, such as a loss of arbitration or a mismatch between an expected phase of the second bus and the actual phase of the second bus, during execution of the requested operation; and (3) supplying the Command Done signal and a third output signal, designated herein as an Error signal on Error signal line 110, the Error signal being indicative of an unacceptable error condition during execution of said operation.

Each of the Command Done, Exception and Error signal lines are supplied to the second controller such that the second controller can monitor them without the use of a hardware interrupt.

Where the first controller is a small computer system interface, the Error signal can, for example, be asserted in response to violations of the standardized small computer system interface protocol. A SCSI-3 parallel interface standard is described in the working draft of the document "X3T9.2/855D, Revision 12b, Jun. 7, 1993, reference number ISO/IEC: 199x/ANSI X3,199X", setting forth the standard for defining mechanical, electrical and timing requirements of a SCSI-3 parallel interface in conjunction with the SCSI-3 Interlocked Protocol Standard, the contents of which are hereby incorporated by reference in their entirety.

Aside from supplying the Command Done, Exception and Error signals, operation of the first controller 100 in FIG. 2 will be apparent to those skilled in the art and further description thereof is unnecessary. However, general operation of the first controller 100 will be provided to assist in better understanding aspects of the present invention.

In the exemplary FIG. 2 embodiment, the local bus of the first controller will transition through various phases during execution of a transaction. For example, the local bus of a small computer system interface can transition between bus phases which include a bus free phase, an arbitration phase, a selection phase, a reselection phase, a set-up phase, and one or more information transfer phases (such as, a command phase, a data-in phase, a data-out phase, a status phase, a message-in phase and a message-out phase). Such phases are described in the previously mentioned document "X3T9.2/855D revision 12b" for information transfer on the local bus between any two devices connected thereto. Whenever two devices communicate on the local bus of the first controller, one such device operates in an initiator mode while the other device operates in a target mode.

In the exemplary FIG. 2 embodiment, wherein the first controller 100 is configured as a small computer system interface, the left hand side of the first controller represents the first, main bus for interfacing with the main controller. The main bus includes the data bus 112 (for example, a 16-bit bus) as a bidirectional data bus for interconnecting the first controller 100 with the main controller. The data bus 112 can be used for direct memory access and register access. An associated address bus 114 (for example, a 4-bit bus) supplies address information from the main controller to the first controller 100.

The first controller also receives a read signal line 116, a write signal line 118 and a chip enable signal line 120 from the main controller. The read signal line is used during the reading of internal registers in the first controller, while the write signal line is used to write internal registers of the first controller. The chip enable signal line is used to access internal registers in response to address signals included on the 4-bit address line 114. A clock signal line 122 supplies a clock input, such as a 50 megahertz clock input. A reset signal line 124 supplies a reset signal to the first controller.

The first controller also includes information transfer (for example, handshaking) signal lines for direct memory access (DMA) transfer. A DMA request signal line 126 is used by the first controller to indicate when the first controller is ready to transfer data to the main controller during a DMA transfer. A DMA acknowledge signal line 128 is an input signal line to the first controller which indicates when a DMA interface is ready to transfer data to the first controller. When the signal line 126 or 128 is enabled, accesses to a FIFO register 172 by the main controller, or by any peripheral device connected to the first controller's local bus, are disabled.

The interrupt signal line 130 can be used in conjunction with the Command Done, Exception and Error status signals. In accordance with exemplary embodiments, the interrupt signal line 130 is used to supply an interrupt signal to the main controller upon completion of a transaction or, if desired, upon occurrence of an error or exception (that is, whenever an interrupt register 186 is non-zero and an appropriate bit has been set in an interrupt mask register 188).

The right hand side of the exemplary first controller shown in FIG. 2 represents the local bus of the first controller. The local bus can, for example, be a peripheral device bus which is connected to one or more peripheral devices, such as memory devices (e.g., disk drives, tape drives and so forth), printers or any other intelligent or non-intelligent device. Those skilled in the art will appreciate that where the first controller is a network interface, the second bus can be a network communication link, such as a network bus or wireless link.

The first controller 100 includes an output busy signal line 132 which is asserted by the first controller when it has control of the second bus, and an input busy signal line 134 which is asserted by a peripheral device when acting as a target device which has control of the second bus. An output selection signal line 136 is asserted by the first controller when it selects a destination device, and an input selection signal line 138 is asserted by a peripheral device connected to the second bus for selecting the first controller as a destination. A bidirectional attention signal line 140 provides a signal which is used to monitor phase mismatches of the second bus, and generate an Exception signal.

A bidirectional control/data (CD) signal line 142, bus input/output (I/O) signal line 144, and bus message signal line 146 are used in known fashion to define a phase of the local bus during execution of a given transaction. The control/data signal, which is sourced by the target device, also indicates whether control or data information is on the data signal lines. The input/output signal line, which is sourced by the target device, also controls the direction of data movement on the local bus relative to an initiator device; further, this signal line can also be used to distinguish selection and reselection phases. The message signal is sourced by the target device to indicate the message phase.

In accordance with the present invention, separate input/output bus reset signal lines 148, 150 are provided for sending and receiving reset signals. Similarly, separate output/input request signal lines 152, 154 and separate output/input acknowledge signal lines 156, 158 are provided to send and receive request and acknowledge signals during information transfer. The use of separate input and output signal lines can also be used to provide advantages as described in copending U.S. patent application Ser. No. 08/432,817, filed May 2, 1995, entitled "METHOD AND APPARATUS FOR INCREASING RELIABILITY OF INPUT/OUTPUT CONTROLLERS USING SEPARATE FILTERED AND UNFILTERED INPUTS", the disclosure of which is hereby incorporated by reference in its entirety.

Output data from the first controller 100 is provided to the second bus via an output data signal line 160 (for example, 8-bits) which can include a data parity signal line 162. An input data signal line 164 can include a data parity signal line 166.

Having described the input/output signal lines of the FIG. 2 controller, attention will now be directed to the various registers illustrated in FIG. 2. The first controller 100 can include an identification (ID) register 170 for revision identification information (i.e., a current version of the first controller's internal architecture). A first-in first-out register 172 buffers read or write information to or from a first-in first-out memory 176.

The first-in first-out memory 176 buffers data transferred between the first bus (that is, the bus interconnecting the first controller to the main controller) and the second bus (that is, the local bus of the first controller). A first-in first-out count register 174 identifies the number of bytes stored in the first-in first-out memory 176 at any given time.

Transfer count registers 178 and 180 indicate the number of bytes expected to be transferred in an information transfer phase. Bus status registers 182 and 184 store the current status (that is, phase or state) of the second bus.

Exemplary embodiments include an interrupt register 186 and an interrupt mask register 188. These registers can, if desired, be used to signal an interrupt to the main controller, after which the interrupt mask register 188 can be examined (e.g., polled) to determine the cause of the interrupt in conventional fashion. However, because exemplary embodiments use the Command Done, Exception and Error status signals to monitor execution of a transaction, use of the interrupt register during execution of a transaction can be eliminated.

A sequence register 190 is used to direct the first controller into a particular "phase" of the second bus (that is, a phase into which the second bus is expected to transition for a given command). The target device, for any given transaction, will typically drive the phases of the local bus. Accordingly, where the first controller is in an initiator mode, the requested sequence is one expected to be entered by the target device. When the first controller is in the target mode, the phase is one which the first controller will enter next.

Bit locations of the sequence register, in accordance with exemplary embodiments, are designated as follows: (1) a first bit location indicates whether an information transfer is to be done using direct memory access; (2) a target mode bit location indicates that the first controller is to be placed into the target mode for executing a command identified within subsequent bit locations of the sequence register; this bit location is cleared when the first controller is placed into an initiator mode; (3) an attention bit location indicates, for initiator mode selection and information transfer phases, that the attention signal line will be asserted (in initiator mode) or compared against this bit (in target mode); and (4) a location (for example, four bits) which designates an encoded value of a given command to be executed. This four bit command can be decoded by the bus sequencer to identify an expected phase, or state, of the second bus.

In accordance with exemplary embodiments where the first controller is a small computer system interface, the message, control/data and input/output signals can be used to identify up to eight different information transfer phases. Six information transfer phases which are used in conjunction with the SCSI-3 protocol are: (1) a data-out phase; (2) a data-in phase; (3) a command phase; (4) a status phase; (5) a message-out phase; and (6) a message-in phase. In addition to the information transfer phases, connection phases can also provided and include: (1) an arbitration phase; (2) a selection (or reselection) phase; and (3) a bus free phase. In accordance with exemplary embodiments, a target device continuously maintains the state of phase signals until a request is received which results in a change of state. The actual phase of the second bus is represented by actual values of the message, control/data and input/output signals, as monitored by the bus sequencer 102 for comparison with the expected phase, as decoded by the bus sequencer using the command bits stored in the sequence register 190.

Given the foregoing phases, commands which can be encoded into the sequence register include: (1) an arbitrate command; (2) a selection command; (3) a command-phase command; (4) a status command; (5) a data-out command; (6) a data in command; (7) a message-out command; and (8) a message-in command.

The arbitrate command, during normal processing, is completed when arbitration has been won. If arbitration has been lost, the Exception is asserted. If a reset signal is asserted during execution of the arbitrate command, then the Error signal is asserted.

The arbitrate command is used to initiate arbitration for the local bus. This command places the source identification information stored in the source identification register 198 on the local bus to perform bus arbitration. If the source identification stored in the register 198 is of highest contending priority, then the first controller asserts the selection command on selection signal line 136 and arbitration has been won. However, if another device on the second bus has higher priority or has asserted its selection signal, the first controller has lost arbitration and will release its busy signal on busy signal line 132 and arbitration identification. As a result, an arbitration lost bit in the exception register 194 is set, such that the Command Done and Exception signals are asserted and an interrupt generated.

The selection command, during normal operation, is completed when a designated destination has been selected. However, if the time in the select time-out register is exhausted, then the Command Done and Exception signals are asserted. The Error signal is asserted during execution of the selection command if a reset signal is asserted.

The selection command is executed when arbitration has been won. To effect a selection command, the first controller asserts the identification indicated in the destination identification register 200, along with a source identification from the source identification register 198, and then deasserts the busy signal on busy signal line 132. The first controller waits, for the time specified in the select time-out register 196, for the busy signal to be asserted by the destination device. If the attention bit of the sequence register has been set, the attention signal is asserted before releasing the busy signal. If the first controller is in the target mode, then the input/output signal is asserted and a reselection phase is entered.

Once a destination has been selected, an information transfer command, or service, can be used to initiate information transfer. The command-phase command, status command, data-out command, data-in command, message-out command and message-in command constitute information transfer commands. In normal operation, these commands are executed until the transfer count stored in the transfer count register has been exhausted.

For example, when command information is to be transferred from an initiator device to a target device, a command request is received by the target device. In accordance with standard SCSI-3 protocol, a command phase is identified by the target device asserting the control/data signal and negating the message and input/output signals. In response, the initiator places the command information on the data bus and begins an information transfer.

The status service is used to transfer status information from the target device to the initiator device. The data-out service is used to transfer data from the initiator device to the target device. The data-in service is used to transfer data from the target device to the initiator device. The message-out and message-in services are used to transfer a message from the initiator device to the target device or vice versa. For any of the information transfer commands, if the attention flag is set, the attention signal is asserted before negating the acknowledge signal; if the attention flag is cleared, the attention signal is negated prior to asserting the acknowledge signal.

As mentioned above, information transfer commands are executed until the transfer count stored in the transfer count registers is exhausted. However, execution of these commands can be discontinued if: an Exception signal is asserted in response to a phase mismatch; or an Error signal is asserted. If during execution of the information transfer commands, a phase mismatch is detected, the Exception signal is asserted. If during execution of any of these data transfer commands, the reset signal becomes active, then the Error signal is asserted. The Error signal is also asserted during execution of the status command, the data-in command or the message-in command if a parity error is detected.

A phase mismatch of a small computer system interface bus can be detected in any number of ways. For example, the bus sequencer can compare the current phase of the local bus, as determined by the bus sequencer monitoring the message, control/data and input/output signal lines, with a phase of the bus expected by the bus sequencer 102, as determined by decoding the command issued by the main controller and stored in the sequence register. If the bus sequencer determines that the expected phase and actual phase of the second bus do not match, the bus sequencer 102 indicates that a phase mismatch has occurred by setting a flag in the Exception Register 194.

A phase mismatch can also be identified if, during information transfer, the target mode bit of the sequence register is set such that the first controller will set the local bus phase status signals (i.e., the message, command data and input/ output commands) to the appropriate state and use the request/acknowledge signals for information transfer. In the target mode, the attention bit in the sequence register can used as a phase comparison bit during execution of an information transfer command. The attention bit can be compared against the attention signal on attention signal line 140 at a trailing edge of the acknowledge signal. If the state of the attention bit in the sequence register does not match that of the attention signal on a trailing edge of the acknowledge signal, a phase mismatch is detected and used to assert an Exception signal. At that time, the transfer of data is discontinued and a message-out phase entered for the purpose of allowing an initiator device-to-target device information transfer.

In addition to identifying a given command to be executed, the sequence register also can include bit locations to designate a bus free condition of the local bus. A bus free condition is used to indicate that the local bus is expected to transition to a bus free phase, wherein the busy and selection signals are both false. Note that upon completion of a transaction, the busy signal is cleared. If a phase mismatch is detected during transition to a bus free condition, the Exception signal is asserted. If a reset signal is asserted during execution of a bus free condition, then the Error signal is asserted.

When the first controller is in an initiator mode, before the bus free condition is indicated, the acknowledge signal will be negated and then the busy signal is expected to go false. If the first controller detects a request has been asserted before the busy signal goes false, then the phase mismatch bit will be set and an Exception signal is asserted. If the transfer mode bit is set, the first controller will release the busy signal from the bus.

In addition to the sequence register described above, the first controller 100 also includes an error register 192 for storing an error status and the exception register 194 for storing an exception status. Further, the first controller includes a selection time-out (TO) register 196 for storing a selection time-out condition, the source identification register 198 for storing a bus identification of the first controller (that is, for use during arbitration), the destination identification register 200 for storing an identification of a device to be selected or reselected, and a synchronization register 202 for storing synchronization parameters used in conjunction with a synchronization mode, depending on the speed with which information is to be transferred.

The Command Done signal is used as a status signal for indicating when a given command has been completed by the first controller. When the command has not been properly executed, the Exception register, the Error register and the interrupt register are used to supply such additional status information.

More particularly, the exception register 194 identifies conditions which are usually not errors, but which can cause the sequence to stop for processor intervention. The exception register is cleared by writing the register with 1's in the bits to be cleared or by writing a 1 in the exception bit location in the interrupt register.

The exception register 194 includes, for example, any one or more of: (1) a bit location which is set if the first controller has been selected as a target and the attention signal on the second bus has been asserted; (2) a bit location which is set if the first controller has been selected as a target and the attention signal was not asserted at the time of selection; when set, this bit location indicates that the target device identification and initiator device identification are stored in the last byte of the first-in first-out memory 176; (3) a reselected bit location which is set if the first controller is reselected as a host; when set, the target device identification and the initiator device identification are stored in the last byte of the first-in first-out memory 176; (4) a phase mismatch bit location which is set if a certain phase was expected but another phase is driven by the target device; when set, the bus status register 182 can be interrogated to determine the current phase of the bus and to take appropriate action (that is, generate an Exception signal); and (5) a select time-out bit which is set if the time indicated within the selection time-out register has exhausted prior to the destination device being selected.

The error register 192 includes bits which indicate when various error conditions are TRUE. This register is cleared by writing 1's to the bits to be cleared or by writing a 1 to an error bit in the interrupt register. In an exemplary embodiment, this register includes any one or more of: (1) a bit location to indicate that a target device released the busy signal somewhere between a successful selection and the issuing of a bus free command; (2) a reset signal bit location to indicate whether the reset signal was or is asserted as a reset interrupt; after receiving the reset interrupt, the bus reset signal (bit 7 of bus status register 182) is polled until reset goes away; (3) a sequence error bit location to indicate that a command was issued to the first controller while an Exception or Error signal was pending; and (4) parity error bit locations which indicate if, for example, the calculated parity of incoming data does not match the parity bit supplied on incoming data parity signal line 166.

The interrupt mask register 186 is used to mask out interrupts from any or all of the interrupt sources. The interrupt register combines a status of the Error, Exception and Command Done signals into one interrupt source. More particularly, the error bit of the interrupt register represents that the Error signal has been set. An Exception bit is used to indicate when the exception signal is set, and a command done bit is used to indicate that the Command Done signal has been set.

Those skilled in the art will appreciate that the exemplary embodiment of FIG. 2, as described with respect to a small computer system interface device is by way of example only, and that features of the present invention can be implemented with any protocol-based controller. Further, those skilled in the art will appreciate that the first controller can exploit features of the present invention regardless of whether it operates in an initiator mode or in a target mode.

Figure 1:
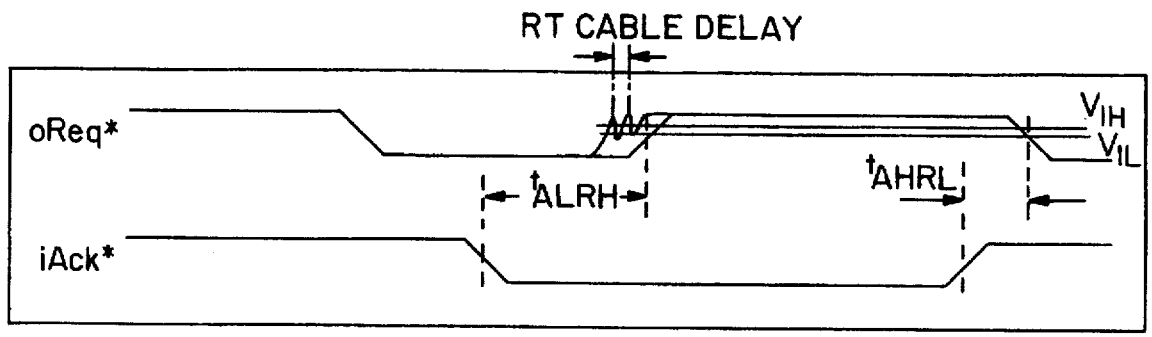
FIG. 1 is a timing diagram which shows an exemplary request and acknowledge signal sequence.
Figure 3:
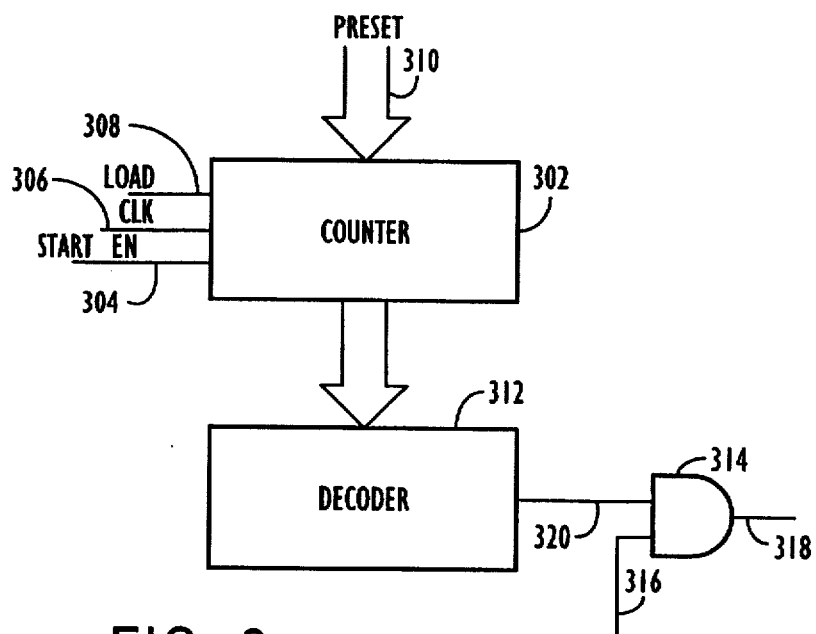
FIG. 3 is an exemplary embodiment of a time domain filter device for use with an information transfer signal line of the present invention.

In accordance with the present invention, FIG. 2 thus constitutes an exemplary embodiment of a means, such as an interface device, for controlling a transfer of information between the main controller and at least one device, the interface device having a first signal line for receiving at least one information transfer signal which is input during information transfer between the controller and the at least one device and having a second signal line for sending said at least one information transfer signal during information transfer between the controller and the at least one device FIG. 3 illustrates an exemplary embodiment of a filter means, such as a time-domain filter device, which can be used in conjunction with bidirectional signal lines of the FIG. 2 embodiment. The time-domain filter is connected to the first signal line to control a time at which the first signal line is sampled for receipt of the at least one information transfer signal. Unlike conventional input/output controllers which use a single signal line to both send and receive bidirectional information transfer signals, exemplary embodiments of the present invention use an output send signal line and a separate input receive signal line. Further, an internal or external time domain filter is applied to the input signal line, so that the filter's impedance will not affect information transfer signals which are sent.

In accordance with the exemplary FIG. 2 embodiment, two separate output pins of the small computer system interface are provided for use with a request signal. In the FIG. 2 embodiment, separate input/output pins are also provided for the acknowledge signal. Separate input/output signal lines can also be used for the busy signal, the select signal and the reset signal. However, because these signals are not typically performance-based, any advantages realized by using exemplary embodiments of the present invention in accordance with these signal lines may be minimal. The input request signal line, like the input signal lines for the acknowledge, busy, select and reset signals, can include an external filter circuit as shown in FIG. 3.

Any time domain filter circuit, including both analog and digital filters, can be used in accordance with exemplary embodiments. However, in accordance with the present invention, relatively simple filter designs can be used since the filter circuit is user programmable. That is, because the filter circuit is user programmable, its characteristics can be easily varied to accommodate the specific signal line with which it is to be used. Thus, exemplary embodiments of the present invention provide an extremely simple, but effective filter circuit for improving the signal quality of information transfer signals such as the handshaking signals of a small computer system interface. As a result, any need to form complex and costly circuitry on a monolithic integrated circuit is eliminated, yet overall reliability is enhanced. Further, one or more of the time domain filters can be located either within the small computer system of FIG. 2, or can be located externally of the small computer system interface. Each such time domain filter is associated with a given input signal line, such as the input request signal line 148 and the input acknowledge signal line.

In accordance with exemplary embodiments, a filtered input is used to receive information transfer signals during an asynchronous information transfer mode. Because of the high speed performance typically required for a synchronous information transfer, the unfiltered signal line can be used to both send and receive the information transfer signals in a synchronous mode of information transfer.

As previously discussed, exemplary embodiments of the first controller can distinguish an asynchronous mode from a synchronous mode of information transfer by monitoring the request/acknowledge offset value. In an initial mode of information transfer, an asynchronous mode is used whereby incoming information transfer signals, such as an incoming request or acknowledge signal, are input to the first controller of FIG. 2 via their respective filtered input signal line. At either a predetermined time or at periodic intervals subsequent to initiation of the information transfer, attempts can be made to use a synchronous mode of information transfer in an effort to enhance performance.

During the attempted synchronous mode of information transfer, reliable detection of the incoming information transfer signals is monitored by the bus sequencer. Such monitoring can be performed by, for example, detecting receipt of the incoming information transfer signals and incoming response-based information transfer signals (for example, deassertion of an incoming request signal subsequent to the first controller sending an acknowledge signal). If such signals have been reliably detected, then a synchronous mode of operation is retained. In this case, the unfiltered send signal line can be used to both send and receive signals when a synchronous mode of operation is used. Those skilled in the art will appreciate that where the speed of a synchronous mode is relatively slow, a filtered input signal line can be used for that mode of information transfer, if desired.

In an exemplary embodiment, the bus sequencer can enable the signal lines to be used for a given mode of information transfer. For example, in response to detecting a zero offset value, representing an asynchronous mode of information transfer, the bus sequencer can enable the input request signal line 154 to receive an incoming request signal, and enable the output signal line 152 to send any outgoing request signal (where the first controller is in target mode). However, at a predetermined time (for example, upon receipt of an information transfer command following successful arbitration and selection) or periodically, after initiation of an asynchronous mode of information transfer, the first controller can attempt to receive an incoming request signal via the unfiltered output request signal line 152. Upon reliable detection of the request signal, the bus sequencer can retain a synchronous mode of information transfer. As a result, the output request signal line 152 is used to both send and receive request signals. Those skilled in the art will appreciate that a similar operation can be applied to the acknowledge signal lines 156 and 158, or to any other information transfer signal lines which the user wishes to so configure.

In accordance with exemplary embodiments, multiple modes of synchronous information transfer can be used. For example, a fast synchronous mode of information transfer and one or more slower modes of synchronous information transfer can be used. In attempting to switch from an asynchronous mode to a synchronous mode of information transfer, the fast mode can be attempted first. If reliable detection of the information transfer signal during the fast synchronous mode of information transfer is unsuccessful, a slow mode of information transfer can be attempted. If the slow mode of synchronous information/transfer proves unreliable, then operation can return to the asynchronous mode.

In accordance with exemplary embodiments, because the time-domain filter is user programmable, an asynchronous mode of operation can be initiated with the maximum tolerable time delay for detecting an incoming information transfer signal, such as the request signal. During subsequent execution of the information transfer, the time delay can be repeatedly reduced and reliability of detection monitored by the bus sequencer. Provided reliability is not compromised, the time delay value can be continuously reduced by decreasing the preset value stored in the counter. When the value stored in the counter reaches a value close to or equal to a zero time delay, the bus sequencer can automatically switch to a synchronous mode of operation by enabling the send signal line (such as the output request signal line 152) to both send and receive a given information transfer signal during remaining phases of the information transfer.

As shown in FIG. 3, the time domain filter can be a presettable counter 302 which is selectively enabled by a start enable signal line 304. The start enable signal can be any signal which is received some predetermined time before a given information transfer signal is expected to become valid. For example, where the time-domain filter is used in conjunction with an input request signal, the time-domain filter can be enabled in response to a rising edge of the request pulse.

In accordance with exemplary embodiments, upon detecting a rising, trailing edge of an incoming request signal, a counter can be enabled to initiate a delay period. In accordance with exemplary embodiments wherein such a counter is clocked by a 50 megahertz clock signal, an initial delay, for example, 80 nanoseconds can be used in conjunction with a request or acknowledge signal having an exemplary, approximate 200 nanosecond period during a data-in phase of an asynchronous mode or a slow synchronous mode of information transfer. However, those skilled in the art will appreciate that exemplary embodiments of the present invention can be used to detect any edge of a signal, which is used to define an active state of that signal. For example, exemplary embodiments can be used with a leading or trailing edge of a signal, and can be used with either a rising or a falling edge of a signal depending on whichever edge has been selected to define an active state of that signal.

The FIG. 3 counter can be any conventional up or down counter. For purposes of discussion, the FIG. 3 counter 302 is a down counter which is pre-loaded via a load enable signal line 308 with a preset value on a user programmable input signal line(s) 310. The preset value corresponds to the desired, predetermined time delay. Upon receipt of the start enable signal, the counter is enabled to count down at the clock rate of any specific clock, such as the clock of the main controller (e.g., 50 megahertz). Afterwards, the counter can be reset by, for example, sending a response-based signal such as the acknowledge signal.

In the FIG. 3 embodiment, the counter receives clock pulses via a clock signal line 306. Once enabled, the counter continues to count at the clock rate until a count value of the counter matches a preset value as detected by the decoder. Once the counter reaches a value of zero, as determined by a decoder 312, the request signal line can be examined to determine whether a valid request signal has been received.

Those skilled in the art will appreciate that while FIG. 3 has been described with respect to the request signal, exemplary embodiments of the present invention can be used with respect to any information transfer signal. For example, the present invention is equally applicable to the acknowledge signal line which, in the exemplary FIG. 2 embodiment, has also been separated into an input signal line and an output signal line.

Further, those skilled in the art will appreciate that while a counter has been used for the exemplary embodiment of a time-domain filter, any digital or analog circuitry which can provide a selectively enabled, predetermined delay can be used. For example, an analog filter, such as a simple analog integrator, can be used as an analog counter in the FIG. 3 circuit. The analog integrator can be supplied with a fixed input signal upon receipt of a request signal. When the integrator ramps to a predetermined threshold value, as detected by an analog decoder (such as a comparator), an output signal can be generated and used to gate the information transfer line of interest (for example, the request signal on the second input signal line of gate 314 in FIG. 3).

Once the time delay of counter 302 has elapsed, the output of the decoder provides an output signal on decoder signal line 320. The decoder output signal can be supplied to a gate, represented in FIG. 3 as an AND gate 314, to enable a second input signal line 316 of the AND gate. For example, where the rising edge of a request signal is used to enable counter 302, the request signal can be supplied to the second input signal line 316. When both the decoder output and the request signal are logic level high, the output signal line 318 of the AND gate will become logic level high.

At the time the request signal is gated to the output of AND gate 318, reflections in the signal line can be expected to have subsided, such that a valid request signal exists.

Once received, an information transfer signal, such as an incoming request signal, can be latched and used to provide a response based information transfer signal, such as the acknowledge signal in a manner as described in commonly assigned co-pending U.S. application Ser. No. 08/432,803, filed May 2, 1995 entitled "METHOD AND APPARATUS FOR ENHANCING INPUT/OUTPUT CONTROLLER OPERATION USING A SIGNAL LATCH".

Those skilled in the art will appreciate that while a down-counter has been described, a up-counter can also be used in accordance with exemplary embodiments of the present invention. For example, the counter can count up at the clock rate to a preset value upon receipt of the start enable signal. When the counter reaches the preset value, the small computer system interface can evaluate the signal on output signal line 318 to detect a valid information transfer signal.

Those skilled in the art will appreciate that by providing a time domain filter to monitor receipt of a bidirectional information transfer signal, such as the request signal of a small computer system interface, any use of analog low-pass filters or other filter devices for removing higher frequency reflections and noise can be eliminated. Alternately, those skilled in the art will appreciate that features of the present invention can be used with a controller in conjunction with features of commonly assigned co-pending U.S. application Ser. No. 08/432,817, filed May 2, 1995, entitled "METHOD AND APPARATUS FOR INCREASING RELIABILITY OF INPUT/OUTPUT CONTROLLERS USING SEPARATE FILTERED AND UNFILTERED INPUTS". For example, features of the co-pending application can be used for any one or more of the information transfer signal lines, while exemplary embodiments of the present invention can be used with respect to any or all of the remaining information transfer signal lines.

Because the time-domain filter can be readily programmed by the user, the filter can be formed on an integrated circuit with the first controller yet remain independent on the process by which the small computer system interface is formed (e.g., on a monolithic integrated circuit). Further, by providing a time-domain filtered signal line which is separate from an unfiltered signal line, improved reliability of information transfers can be achieved without significantly affecting performance during an asynchronous mode of information transfer, and without inhibiting use of synchronous modes of information transfer.

Those skilled in the art will appreciate that a filtered input and an unfiltered input/output can be used to provide both synchronous and asynchronous information transfer capabilities, as described above. Alternately, separate dedicated inputs can be provided in conjunction with a dedicated output to accommodate asynchronous and synchronous modes, respectively. In the latter embodiment, the input dedicated to synchronous information transfer can be unfiltered or can be modified to include a filter having characteristics (for example, a smaller delay) different than that of the filtered input used for synchronous transfer. Exemplary embodiments of the present invention can thus provide an extremely simple, but effective time-domain filter circuit for improving the reliability of information transfer signals, such as handshaking signals, by reducing any influence of signal reflections on signal detection.

It will be appreciated by those skilled in the art that the present invention can be embodied in other specific forms without departing from the spirit or essential characteristics thereof. The presently disclosed embodiments are therefore considered in all respects to be illustrative and not restricted.

The scope of the invention is indicated by the appended claims rather than the foregoing description and all changes that come within the meaning and range and equivalence thereof are intended to be embraced therein.

What is claimed is:

1. Apparatus for transferring information between a controller and at least one device, said apparatus comprising:

an interface device for controlling a transfer of information between said controller and said at least one device, said interface device having a first signal line for receiving at least one information transfer signal which is input to said apparatus during information transfer between said controller and said at least one device and having a second signal line for sending said at least one information transfer signal during information transfer between said controller and said at least one device; and a time-domain filter connected to said first signal line to control a time at which said first signal line is sampled for receipt of said information transfer signal.

2. Apparatus according to claim 1, wherein said interface device is a small computer system interface which is connected to a first bus of a main controller and to a local bus which is connected to one or more peripheral devices.

3. Apparatus according to claim 1, wherein said information transfer signal is a request signal, said first and second signal lines being input request and output request signal lines, respectively of said interface device.

4. Apparatus according to claim 1, wherein said information transfer signal is an acknowledge signal, said first and second signal lines being input acknowledge and output acknowledge signal lines, respectively of said interface device.

5. Apparatus according to claim 1, wherein said time-domain filter further includes:

a digital counter.

6. Apparatus according to claim 5, wherein said time-domain filter further includes:

an enable signal line for enabling said counter to begin counting; and a decoder for detecting when a count value of said counter matches a preset value.

7. Apparatus according to claim 6, wherein said time-domain filter further includes:

a gate which is responsive to an output of said decoder for gating said at least one information transfer signal to said first signal line.

8. Apparatus according to claim 1, wherein said time-domain filter includes:

an analog time-domain filter.

9. Apparatus according to claim 1, wherein said time-domain filter is formed with said interface device in an integrated circuit.

10. Apparatus according to claim 1, wherein said time-domain filter further includes:

a programmable input for setting a predetermined time delay of said filter.

11. Apparatus according to claim 10, wherein said programmable input is used to selectively reduce said predetermined time delay during an asynchronous mode of information transfer.

12. Apparatus according to claim 1, further including:

a bus sequencer for selectively enabling said first signal line to receive said at least one information transfer signal during an asynchronous mode of operation, and to selectively enable said second signal line to both receive and send said at least one information transfer signal during a synchronous mode of information transfer.

13. Method for transferring information between a controller and at least one device, comprising the steps of:

receiving at least one information transfer signal which is input via a first signal line during information transfer between said controller and said at least one device;

sending said at least one information transfer signal via a second signal line during information transfer between said controller and said at least one device; and filtering said first signal line by controlling a time delay with which said first signal line is sampled for receipt said information transfer signal.

14. Method according to claim 13, wherein said information transfer signal is a request signal, said first and second signal lines being input request and output request signal lines, respectively.

15. Method according to claim 13, wherein said information transfer signal is an acknowledge signal, said first and second signal lines being input acknowledge and output acknowledge signal lines, respectively.

16. Method according to claim 13, wherein said step of filtering further includes a step of:

producing said time delay with a digital counter.

17. Method according to claim 13, wherein said step of filtering further includes a step of:

producing said time delay with an analog circuit.

18. Method according to claim 13 further including a step of:

selectively reducing said time delay during an asynchronous mode of information transfer.

19. Method according to claim 13, further including a step of:

selectively enabling said first signal line to receive said at least one information transfer signal during an asynchronous mode of information transfer; and selectively enabling said second signal line to both send and receive said at least one information transfer signal during a synchronous mode of information transfer.

20. Apparatus for transferring information between a first device and a second device, said apparatus comprising:

an interface for controlling a transfer of information between said first device and said second device, said interface having at least one signal line for receiving at least one information transfer signal which is input to said apparatus during information transfer between said first device and said second device, and for sending said at least one information transfer signal during information transfer between said first device and said second device; and a filter connected to said at least one signal line to control a time at which said at least one signal line is sampled for receipt of said information transfer signal, wherein said filter further includes a programmable input for setting a predetermined time delay of said filter to reduce an influence of signal reflections on signal detection.

* * * * *